A. BARNES.

Assignor of one-half Interest to M. BARNES.

CORN PLANTER.

No. 7,521. Reissued Feb. 20, 1877.

Witnesses:
P. R. Richards
Chas. Lupper

Inventor:
Alden Barnes
By P. R. Richards,
Atty.

N. PETERS, PHOTO-LITHOGRAPHER, WASHINGTON, D. C.

UNITED STATES PATENT OFFICE.

ALDEN BARNES, OF BLOOMINGTON, ILLINOIS, ASSIGNOR OF ONE-HALF INTEREST TO MONROE BARNES.

IMPROVEMENT IN CORN-PLANTERS.

Specification forming part of Letters Patent No. 132,792, dated November 5, 1872; reissue No. 7,521, dated February 20, 1877; application filed January 16, 1877.

DIVISION A.

*To all whom it may concern:*

Be it known that I, ALDEN BARNES, of Bloomington, in the county of McLean and State of Illinois, have invented certain new and useful Improvements in Corn-Planters, which improvements are fully set forth in the following specification and accompanying drawing, in which—

Figure 1:
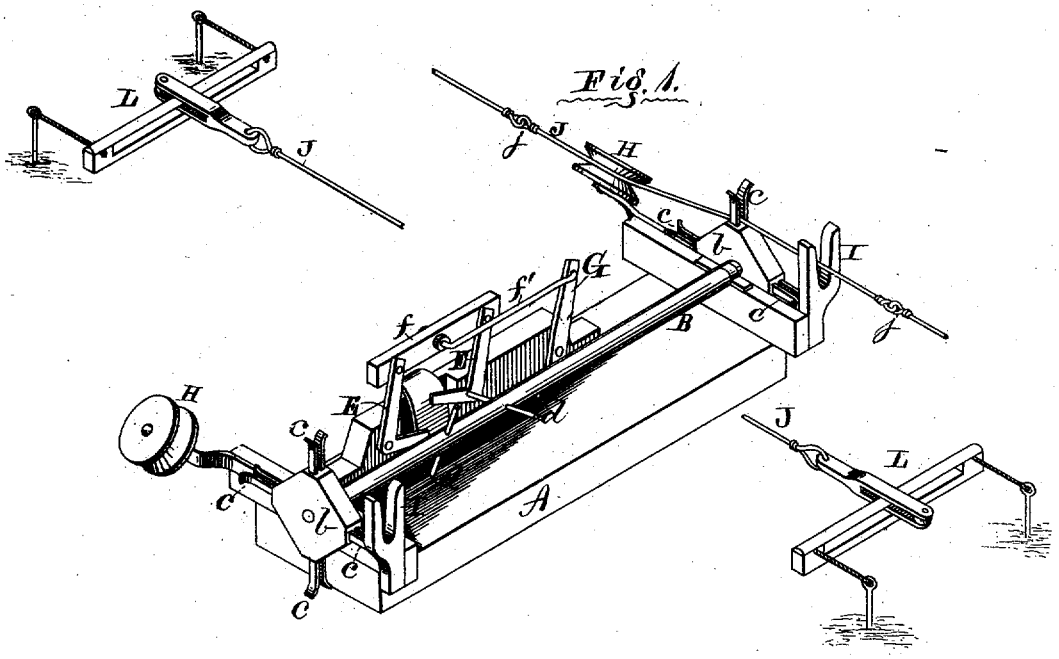
Figure 2:
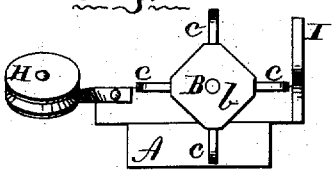

Figure 1 is a perspective view of a construction embodying my invention, and Fig. 2 is a side elevation of the same.

My invention relates to that class of corn-planters having dual seed measuring and dropping devices connected with a vibrating bar, by which they may be simultaneously operated for planting two rows of corn at each passage of the machine; and the invention relates especially to the mechanism for actuating said vibrating bar by means of periodical impulses received from a flexible actuating device carrying regularly-recurrent knots or trippets, and stretched across the ground to be planted, in such manner as to drop the corn in check-rows, or systems of rows transversely with the system of rows parallel with the path of the machine in traversing the field.

The invention consists, first, in the employment of an intermittently-rotating shaft, in combination with a knotted actuating-chain device, and with the vibrating bar for operating the seed-slides of a corn-planter, whereby the intermittent rotary motion of the shaft received from periodical contact with the knots on the stretched chain will impart a vibrating motion to the seed-slide-operating bar, and thereby actuate the seed measuring and dropping mechanism; second, it consists in the employment of a series of forked levers or tappets on the end or ends of the intermittently-rotating shaft, and arranged radially and in such manner thereon that the movement of one tappet by contact with one knot on the actuating device will partially rotate the shaft to which the tappets are fixed, and thus bring the next tappet into position for being acted upon by the next succeeding knot; third, it consists in the use of bent levers, having two of their ends connected by a bar, which is connected by suitable devices with the bar for operating the seed-slides, with which it is combined in such manner that oscillating either lever to actuate the seed-slides will bring the other lever into proper position for being oscillated for the same purpose; fourth, it consists in the employment of wipers, carried by the intermittingly-rotating shaft, and arranged to operate the bent levers alternately; and, further, to details of construction and arrangement, hereinafter more fully set forth and claimed.

Referring to the drawing by letters, the same letter indicating the same part in the different views, letter A represents a bar, on which my improvements are mounted. It may be an integral portion of a corn-planter, or it may be an independent piece, and is mounted transversely on the machine adjacent to the seed-boxes, and should be long enough to furnish suitable bearings for a rotating shaft, B, which extends a short distance beyond each side of the planter. To each end of the shaft B are secured, by means of heads *b*, four radiating equidistant forked lever arms or tappets, *c*, and projecting radially from the main portion of same shaft are four pins or wipers, *d*. E E are bent levers, pivoted at their angles or bends to an upwardly-projecting portion of the bar A, and their upper arms connected by a link, *f*, to which they are hinged or pivoted. From the link *f* another link, *f'*, extends to and is connected with the upper arm of the usual hand-lever G, by which the usual reciprocating bar which connects the seed-slides of an ordinary corn-planter is operated. The bent levers E and wipers *d* are placed in such relative positions that in rotating the shaft B the wipers *d* will alternately impinge against the free arms of the levers E, and alternately raise them and oscillate said levers. Raising the free arm of either lever will, through their connecting-link *f*, move the free end of the other lever downward and into position for being acted upon by the next wiper, as will be evident from an inspection of Fig. 1 of the drawing. H is a pulley, and I a forked guard, arranged so that a pulley shall be in front and a guard in rear of each series of radial forked levers *c*, to serve as guides to retain the knotted actuating device J in proper contact with the forked levers *c* as the machine is drawn across the field.

The actuating-chain J is staked fast or anchored at each end by a device, L, or other device, and has knots or enlargements *j* at regularly-recurring distances apart, corresponding to the distance the hills of corn are to be from each other; and as the machine is drawn forward, with the chain resting in the fork of one of the levers *c*, a knot, *j*, will engage a lever, *c*, and, carrying it over, rotate the shaft B one-quarter of a revolution, and thus bring said lever *c* into position to release the knot, and its next following lever *c* into position for being acted upon in the same manner by the next approaching knot *j*, for rotating the shaft B another one-fourth of a revolution. The wipers *d* are placed relatively to the forked levers *c* so that each impulse given to the shaft A by each successive knot *j* will cause a wiper, *d*, to move one of the bent levers E, and impart an impulse to the seed-dropping devices through the connecting devices, and thereby discharge a hill of seed.

The knotted device should, preferably, be stretched in such position that as the machine crosses the field in one direction the knots may act upon the forked arms on one side of the machine, and as the machine makes the return passage the knots may act upon the forked arms upon the other side of the machine, the ends of the shaft B and its affixed forked levers *c* being each a duplicate of the other.

Having thus described my invention, what I claim as new, and desire to secure by Letters Patent, is—

1. In combination with the lever G, for operating the seed-slides of a corn-planter, an intermittently-rotating shaft, B, and actuating knotted chain J, substantially as described, and for the purpose specified.

2. In combination with the knotted chain J and shaft B, for actuating the seed-dropping parts of a corn-planter, the series of radial forked levers *c*, arranged on said shaft B, so that the movement of one by contact with a knot will bring the next succeeding one into proper position for the action of the next succeeding knot, substantially as and for the purpose specified.

3. Bent levers E, connected by a link, *f*, in combination with actuating-wipers *d* and bar G, for operating the seed-dropping devices of a corn-planter, substantially as described, and for the purpose specified.

4. The intermittently-rotating shaft B, having wipers *d*, arranged to operate with the bent levers E alternately, and the lever G and link *f'*, substantially as described, and for the purpose specified.

5. The intermittently-rotating shaft B, having forked levers *c* on its ends and wipers *d* on its central part, combined with the knotted chain J, bent levers E, links *f f'*, and lever G, substantially as described, and for the purpose specified.

In testimony that I claim the foregoing as my invention I have hereunto affixed my signature this 4th day of January, 1877, in presence of two witnesses.

ALDEN BARNES.

Witnesses:
E. H. SHORES,
JAS. R. BROOKS.